United States Patent [19]

Lee et al.

[11] Patent Number: 5,912,782
[45] Date of Patent: *Jun. 15, 1999

[54] SYSTEM AND METHOD FOR ADJUSTING ACTUATOR CONTROL CURRENT FOR DIRECTIONAL TORQUE VARIANCE IN A DISK DRIVE

[75] Inventors: Troy T. Lee; Eric Gregory Oettinger; Louis Joseph Serrano; Mantle Man-Hon Yu, all of San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/623,261

[22] Filed: Mar. 27, 1996

[51] Int. Cl.$^6$ .................................................. G11B 5/55
[52] U.S. Cl. ................................. 360/78.09; 360/78.04
[58] Field of Search ........................... 360/78.09, 78.07, 360/77.04, 78.06, 78.04, 77.02

[56] References Cited

U.S. PATENT DOCUMENTS

| | | |
|---|---|---|
| 4,030,132 | 6/1977 | Iftikar et al. . |
| 4,536,809 | 8/1985 | Sidman ............................. 360/77.04 |
| 4,679,103 | 7/1987 | Workman ......................... 360/78.07 |
| 4,835,633 | 5/1989 | Edel et al. ..................... 360/78.09 X |
| 4,899,234 | 2/1990 | Genheimer . |
| 4,908,561 | 3/1990 | Hashimoto ................... 360/78.07 X |
| 4,982,298 | 1/1991 | volz et al. . |
| 5,132,855 | 7/1992 | Waugh et al. . |
| 5,150,266 | 9/1992 | Albert . |
| 5,189,571 | 2/1993 | Murphy et al. . |
| 5,305,160 | 4/1994 | Funches et al. . |
| 5,339,206 | 8/1994 | Takahashi ................... 360/78.09 X |
| 5,404,254 | 4/1995 | Kisaka . |
| 5,459,624 | 10/1995 | Erickson et al. . |
| 5,473,230 | 12/1995 | Dunn et al. . |
| 5,476,015 | 12/1995 | Valent . |
| 5,497,059 | 3/1996 | Tajima et al. . |
| 5,566,095 | 10/1996 | Cameron et al. ............ 360/78.09 X |
| 5,646,797 | 7/1997 | Kadlec et al. ............... 360/78.09 X |

FOREIGN PATENT DOCUMENTS

| | | |
|---|---|---|
| 59-171079 | 9/1984 | Japan . |
| 4-339371 | 11/1992 | Japan . |

OTHER PUBLICATIONS

IBM Research Journal, Nov. 1974, pp. 506–512, R.K. Oswald, "Design of a Disk File Head Positioning Servo".

*Primary Examiner*—Aristotelis M. Psitos
*Assistant Examiner*—James L. Habermehl
*Attorney, Agent, or Firm*—Ingrid M. Foerster; Monica D. Lee; David W. Victor

[57] ABSTRACT

A servo control system and method for accurately controlling the actuator in a rotatable storage device by adjusting a corrective control signal according to the mode of operation of the actuator and the direction of actuator movement. During track following the corrective control signal is adjusted by a first factor determined by the ratio of a nominal force or torque factor to the actual force or torque factor at the current radial actuator position. When the actuator is seeking in a first direction, the corrective control signal is adjusted by a second factor determined by adjusting the first factor by a first amount, $K_{fwd}$. When seeking in the reverse direction, the corrective control signal is adjusted by a third factor determined by adjusting the first factor by a second amount, $K_{rev}$. $K_{fwd}$ incorporates measured variations in force or torque factor when the actuator is moving in the forward direction. Similarly, $K_{rev}$ incorporates measured variations in the force or torque factor when the actuator is moving in the reverse direction.

34 Claims, 6 Drawing Sheets

SYSTEM AND METHOD FOR ADJUSTING ACTUATOR CONTROL CURRENT FOR DIRECTIONAL TORQUE VARIANCE IN A DISK DRIVE

FIELD OF THE INVENTION

The present invention relates generally to rotating data storage devices, and more particularly, to a system and method for providing accurate servo control of an actuator in an environment wherein torque conditions vary with seek direction.

BACKGROUND OF THE INVENTION

Magnetic disk drives and similar rotating storage devices are well known in the art. Data is stored on the surfaces of one or more vertically stacked storage disks. The data is "written" to, and "read" from the disks with one or more magnetic transducers or read/write heads. The heads are electrically coupled to signal processing electronics which provide a data transfer path between the drive and a host system. The heads are supported in close proximity to the disk surfaces by an actuator assembly, including an arm structure and a voice coil. The voice coil radially positions the arm structure in response to a control current. In rotary actuator disk drives, the movement of the heads across the disk surfaces defines an arcuate path, whereas in linear actuator files, as the name suggests, movement is linear in the radial direction.

The actuator has two distinct modes of operation. During "track seeking", the heads are moved from a current radial position on the disk to a desired or "target" radial position or cylinder in preparation for data access. "Track following" is the function of maintaining an active head in alignment with the target track while reading or writing data, or merely idling. In most disk drives today, a closed loop servo system controls the operation of the actuator assembly. During seeks, it operates to minimize overshoot and reduce random transient vibration when moving the actuator across the tracks. When track following, the loop functions to reduce repeatable and non-repeatable runout, and to counteract biasing forces. Examples of disk drive servo control systems are provided in commonly assigned U.S. Pat. Nos. 4,679,103 and 5,404,254. For a discussion of control systems in general and definitions of related terms of art, the reader is referred to a book entitled "Modern Control Engineering", by K. Ogata, published by Prentiss-Hall Corporation of Englewood Cliffs, N.J. For a discussion of general disk drive control systems during track seeking and track following, the reader is referred to "Design of a Disk File Head-Positioning Servo" by R. K. Oswald, IBM Journal of Research and Development, November 1974, pp. 506–512.

An ongoing challenge to disk drive designers has been to provide accurate servo control of the actuator. Accuracy becomes increasingly critical as the track densities of disk files increase. However, inaccuracies are introduced into the servo control system whenever actuator behavior varies from a nominal, expected performance.

Variation in actuator behavior is attributable in part to variations in the force factor (Kf) of the actuator, where Kf represents the amount of force applied to the actuator per unit of input control current. For rotary actuator files, the force factor may also be expressed in terms of torque factor, KT, or Kf*Len, where Len is the actuator arm length. The nominal Kf for a particular disk drive design is determined by such factors as the nominal strength of the field between the permanent magnets of the actuator and the number of turns of the voice coil. Variation in Kf from file to file is primarily attributable to file-to-file variations in the strength of the magnets, and to a lesser extent to the number of turns of the coil and the inertia of the actuator. Kf also varies within a single file because the strength of the magnets vary over time, and with actuator position.

The phenomenon of Kf variation with actuator position is best understood by considering the structure and operation of the voice coil motor (VCM). A rotary actuator, for example, includes an actuator arm structure pivotally mounted about a vertical axis. The actuator arms extend in a first direction from the pivot axis, and a support structure extends in the opposite direction. A voice coil is fixably mounted to the support structure between a pair of permanent magnets. Thus the coil is positioned within the fields of the permanent magnets and has a range of movement parallel to their planes. Movement of the coil is maintained within the magnetic field by crash stops or similar restrictive structures.

When a control current is applied to the VCM, a magnetic flux is generated about the coil which interacts with the permanent magnet field and produces a moving force, F, upon the actuator. Ideally, for a fixed control current, F remains constant throughout the range of actuator movement. But in reality, F varies because the strength of the permanent magnetic field varies with actuator position, r. That is, the field is the strongest along a vertical axis intersecting the centers of the magnets, corresponding to an actuator position somewhere between the inner and outer diameters (ID and OD) of the disk. It is weakest at the vertical field boundaries, corresponding to actuator positions approaching ID or OD.

Kf has also been observed to vary substantially with the magnitude and direction of the actuator control. In disk drives wherein seeks are performed by controlling deceleration, but not acceleration, of the actuator (e.g, where actuator current is at saturation during acceleration and deceleration is controlled by using a deceleration profile to slow down the actuator as it approaches the target track), the variation in current magnitude and direction is manifested as a variation in Kf with seek direction. This variation may be explained by the fact that current applied to the coil generates a magnetic field that either reinforces the field from the permanent magnets, or attenuates it, depending upon the direction and magnitude of the current. The effect becomes particularly significant during the deceleration phase of a seek operation, when coil current is very large.

Variations in Kf, whether due to radial position, magnitude and direction of the seek current, or variations in the file over time due to changing environmental factors, must be accounted for in the servo control system in order to provide accurate actuator positioning. Variations in time may be corrected by occasionally recalibrating KT during file operation.

A number of references describe servo systems having means for compensating for torque variation in a disk drive. For example, commonly owned U.S. Pat. No. 4,835,633 describes a servo control system including means for scaling the control signal to the voice coil motor to counteract positional variations in torque factor. Specifically, a scaling factor is obtained from the ratio of a nominal acceleration factor to the actual, measured torque factor of the file at a current radial position.

U.S. Pat. No. 5,305,160 to Funches et ale, describes a method for compensating for torque variations attributable to radial actuator position and component tolerances, comprising the steps of radially dividing the disk surfaces of a magnetic disk drive into a plurality of zones, testing the torque constant of the VCM in each zone with the motor moving in both directions, calculating and storing in a look-up table a compensation factor for each zone, and then retrieving and applying the appropriate compensation factor to the servo control circuitry dependent upon the zone in which the read/write heads are located during both seeks to a track and track following.

Although Funches et al. teach measuring the torque constant in both seek directions ($K_{in}$ and $K_{out}$), the zone factor is calculated as an average of the two measurements ($K_{ave}$) Thus direction of actuator movement is not addressed by their estimation model.

Published patent application JP 59-171079 to Iwai et al. describes a servo control loop wherein two look-up tables of deceleration curves (i.e., velocity profiles) are provided. One table is used when seeking in the forward direction, and the other when seeking in the reverse direction. Thus, Iwai apparently recognizes torque variation with actuator direction. However, Iwai compensates for model error introduced by directional variations.

More desirable, however, would be a closed loop actuator servo system wherein variation in torque based on seek direction is introduced in a manner such that the positioning error is reduced, rather than merely compensated for, to provide accurate actuator control.

SUMMARY OF THE INVENTION

Accordingly, the present invention is a servo control system and method that enables accurate positioning of an actuator in a storage device by providing means in the servo control system for correcting force or torque factor errors due to variations in the magnitude and direction of the actuator seek current. The present invention addresses the particular case of disk drives which control deceleration during seek operations. In such disk drives, variations in current magnitude and direction correlate directly to the direction of actuator movements and hence, Kf varies with the seek direction. However, it shall be understood by those of ordinary skill in the art that the general concept of the present invention may be adapted to disk drive designs wherein the seek acceleration is controlled. During track following, a corrective control signal is adjusted by a first factor determined from the ratio of a nominal force or torque factor constant to the actual force or torque factor calculated at the present radial location. During track seeking in a first direction, the corrective signal is adjusted by a second factor determined by adding a first value to the first factor. When seeking in the opposite direction, the corrective signal is adjusted by a third factor determined by adding a second value to the first factor. The scaling factors are estimated using a polynomial in which the independent variable is the radial position, r, of a transducer with respect to the disk. The default coefficients of the polynomial are determined based upon population averages or file-by-file measurements. The DC term of the polynomial is adjusted during recalibration operations to reflect environmental and file-specific factors. In addition, and in accordance with the present inventions, the DC term is altered by the first amount for forward seeks, and by the second amount for reverse seeks. The first and second amounts are determined empirically by selecting DC terms that provide the best seek performance for a particular seek pattern in the forward or reverse direction. The determination is made based upon population averages or on a file-by-file basis.

DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Figure 1:
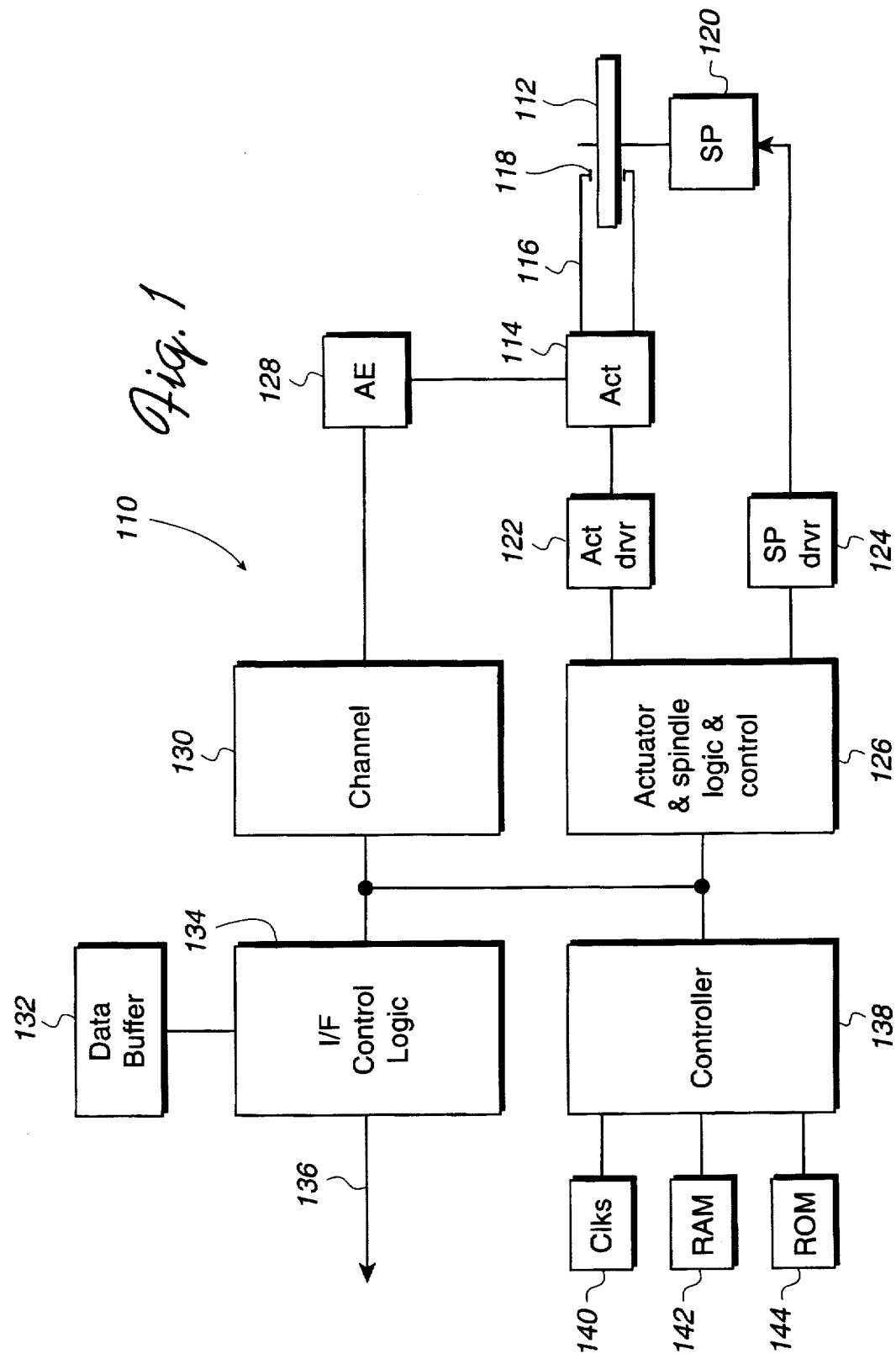
FIG. 1 is a block diagram of a magnetic disk drive suitable for implementing the present invention.

The present invention provides a system and method for accurately controlling the actuator of a rotatable storage device. FIG. 1 illustrates the preferred disk drive system for practicing the present invention. It shall be understood that the present invention is not limited to a particular disk drive designs and can be applied, for example, to magnetic, optical or magneto-optical files.

The disk drive system 110 of FIG. 1 stores information on the surfaces of one or more rotatably mounted magnetic storage disks 112 in the form of magnetic transitions or patterns formed on a plurality of annular data tracks. The disks are rotatably supported by a spindle motor 120, and rotation of the motor is driven by a spindle motor driver 124. The magnetic transitions are sensed or Dread from the disk 112 via one or more transducers 118 supported in close proximity to the disk surfaces. The transducer converts the patterns into an electrical signal which is provided to a data channel 130. The data channel may comprise a partial response, maximum likelihood (PRML) channel, for example.

The transducers are positioned over the disk surfaces by a rotary actuator assembly 114 comprising a voice coil motor (VCM) and a positionable block of one or more actuator arms supporting the transducer(s) on flexible suspension(s) 116. The VCM is driven by actuator driver circuit 122. Control of the actuator and spindle motor driver circuits 122, 124 is provided by actuator and spindle control logic 126 that preferably includes a digital signal processor for carrying out the various operations of the actuator and spindle motor servo control loops.

The write path of the disk drive 110 comprises interface control logic 134 and data buffer 132 for receiving data and commands from the host, a write path within the read/write channel 130 for processing the data prior to writing, and a write transducer 118 for writing the modulated signal to the disk 112. The read path, conversely, comprises a read transducer 118 for sensing data from the disk 112, arm electronics 128 on the actuator for preamplifying the read signal, a read path within channel 130 for processing the amplified signal, and a read path within the interface control logic 134 for transmitting the read data from the file in a form recognizable to the device requesting the data. In the preferred embodiment, the read/write channel also includes servo detection logic for detecting position information written on one or more of the disks 112. The specific functions of the read and write data path elements are well understood by skilled artisans and as such, will not be discussed in further detail.

Master control over the various functions of the disk drive is exercised by a controller 138, which preferably comprises a microprocessor embedded with additional support functions (e.g., counters, an interrupt controller, a direct memory access (DMA) controller, a serial interface controller, and other functions generally known to assist microprocessor control functions). The controller is normally associated with a predetermined amount of read-only-type memory (ROM) 144 for storing a microcode control program; RAM 142; and a reference clock 140. The controller 138 directly oversees operation of the interface control logic 134, the data channel 130, and actuator and spindle control 126 in a manner generally understood in the art.

Figure 2:
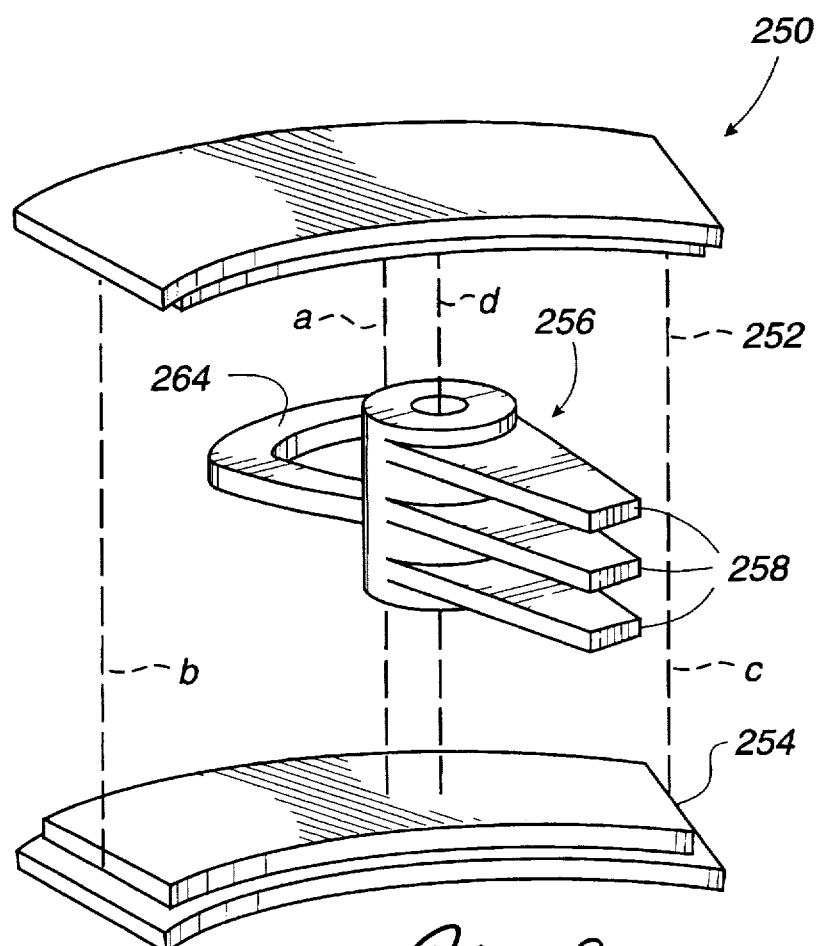
FIG. 2 is an exploded perspective view of a rotary actuator assembly suitable for implementation of the present invention.

FIG. 2 shows a rotary actuator assembly suitable for use in the disk drive of FIG. 1 and for control by the servo control system and method of the present invention. It shall be understood that the actuator of FIG. 2 is provided for illustration purposes only, and that the present invention may be implemented to control a wide variety of actuator assembly designs, including linear actuators, provided that the movement of the actuator is in response to a control signal. The assembly 250 has an arm structure 256 disposed between a pair of permanent magnets 252, 254. The magnets are affixed to opposing walls of the disk drive enclosure (not shown), and generate a magnetic field therebetween. The magnetic field is strongest along a central axis a, and weakest at the outer fringes, as represented generally by axes b and c. The arm structure 256 includes a plurality of arms 258 extending in a first direction and a voice coil 264 extending in the opposite direction. The coil 264 receives a control current from a power amplifier (not shown) and in responses generates a magnetic flux. The magnetic flux interacts with the permanent magnet field to produce a moving force upon the actuator structure 256, causing it to rotate about a pivotal axis d. The range of movement of the coil 264 lies in a plane substantially parallel to the planes of the magnets, and is restricted to the magnetic field by crash stops (not shown) disposed proximate to the outer boundaries of the permanent magnet field. The propulsion means of the assembly, i.e., the coil 264 and permanent magnets 252, 254 constitute a voice coil motor (VCM).

DESCRIPTION OF AN ACTUATOR SERVO SYSTEM

Figure 3A:
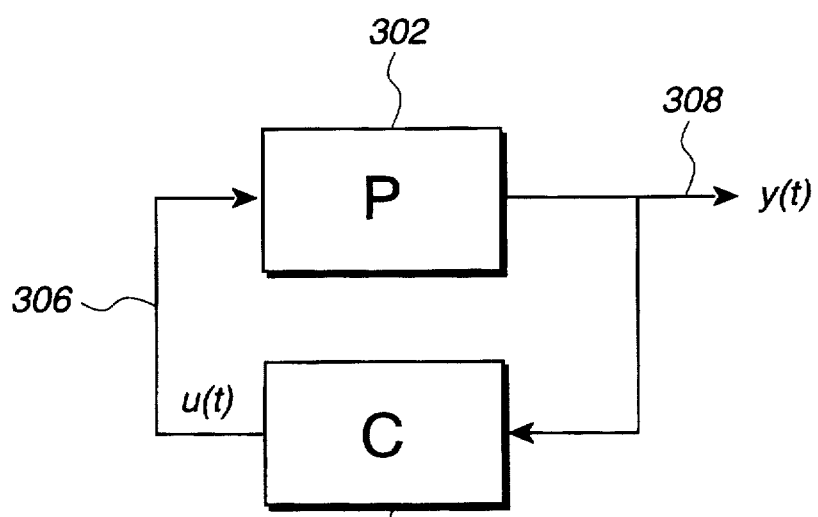
FIG. 3A is a simplified block diagram of a closed loop servo control system.
Figure 3B:
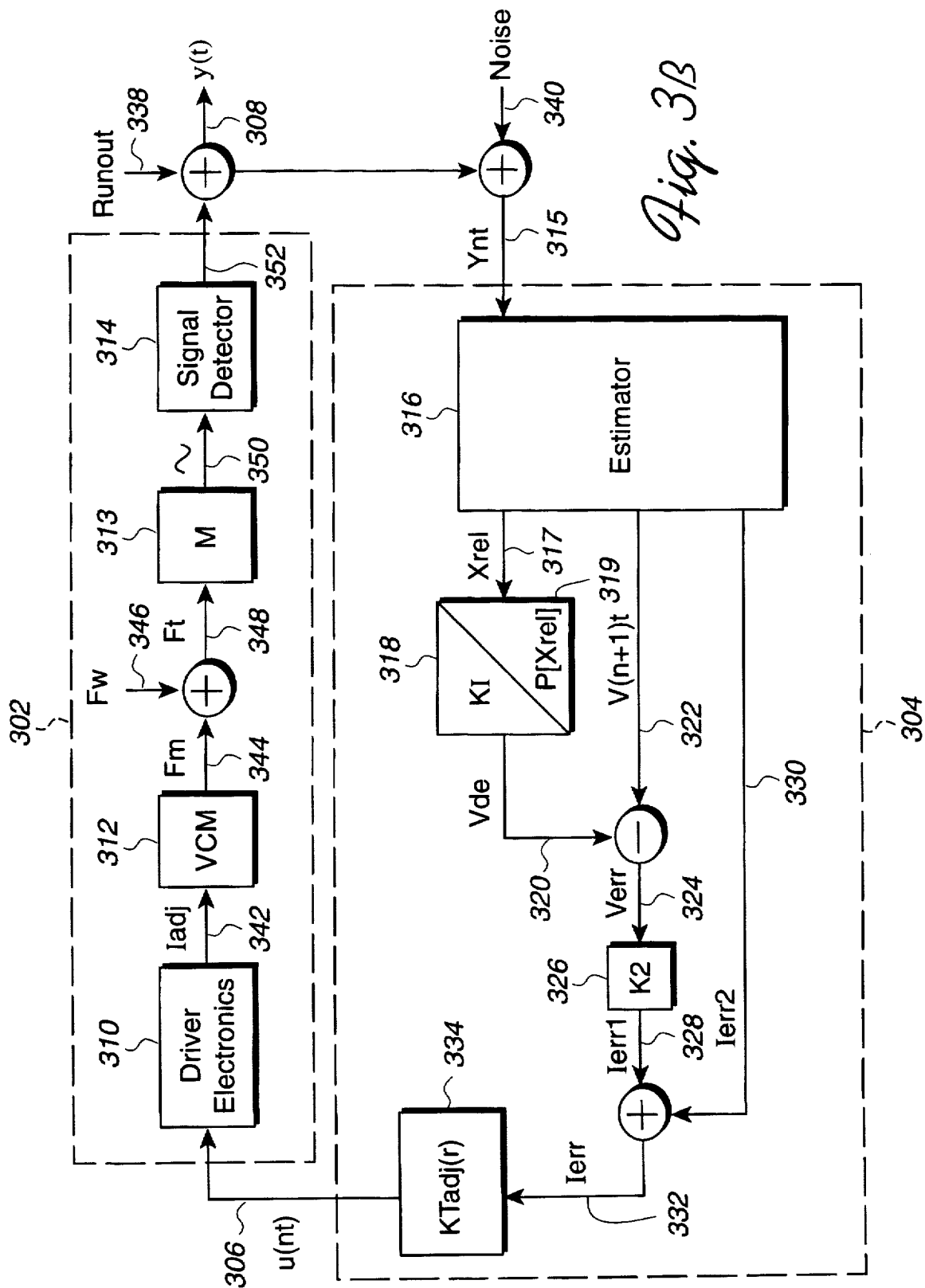
FIG. 3B is a more detailed block diagram of a closed loop servo control system.

Referring now to FIGS. 3A and 3B, a servo control system is represented, including a plant 302, consisting of the actuator assembly 312, driver electronics 310, signal detection electronics 314; and a controller 304, consisting of servo electronics and microcode. As shown in the simplified block diagram of FIG. 3A, the input to the plant 302 is a control signal u(t) 306 commanding the amount of current provided to the voice coil. The output from the plant 302 is a position signal, y(t) 308, typically comprising a track identifier or grey code stitched together with a position error signal (PES), for reporting the actuator position with respect to the disk surface. The track identifier and PES are obtained in most disk drive systems today from servo information stored on the disk(s), either from a dedicated servo disk surface or from servo information embedded on each disk between data regions.

The controller 304 is arranged in a feedback path to the plant 302. Its inputs are the position signal output from the plant 302, and position information provided in commands received from a requesting device. The output of the controller is the control signal u(t) 306 that is input to the plant 302. In general, the purpose of the feedback path is to adjust the control signal u(t) 306 to account for deviations in actual performance versus nominal performance so that the actuator more closely follows an expected nominal behavior representative of a population of disk drives of the same design. Deviations in performance arise, for example, from plant variation, and are communicated to the controller through the position signal.

FIG. 3B provides a more detailed servo control system block diagram. The plant comprises driver electronics 310 an actuator assembly, and servo signal detection logic 314. The actuator assembly is shown in terms of its component parts i.e., the voice coil motor 312, and the actuator arm structure 313 (which includes the mass of the voice coil), to facilitate explanation of the forces acting upon the arm structure 313. The driver electronics 310 receives the control signal, u(nt) 306, from the control portion 304 of the system, and uses it to generate an amplified corrective current $I_{adj}$ 342 to the VCM 312. The corrective current $I_{adj}$ 342 flows through the voice coil of the VCM 312 to produce a magnetic flux which interacts with the magnetic field of the permanent magnets to cause a corrective moving force, $F_m$ 344, upon the actuator arm structure 313. As previously discussed, the amount of force generated by the coil is determined by the coil's force factor, Kf, or force per unit of current, and varies with radial position r of the actuator. Thus the force produced by control current $I_{adj}$ 342 may be expressed as:

$$F_m = Kf(r) \cdot I_{adj} \qquad (1)$$

where r is the radial actuator position.

Windage forces $F_w$ 346 act upon the arm structure and provide an additional component of the total force, $F_t$ 348, so that the total force $F_t$ 348 may be expressed as:

$$F_t = Kf(r) \cdot I_{adj} + F_w \qquad (2)$$

Force $F_t$ 348 moves the transducers of arm structure 313 in a generally radial direction across the surfaces of the storage disk. While the actuator is positioned over the disk, servo information is being read by one of the heads on the arm structure 313. The servo information includes analog position information 350 which is provided to the signal detection logic 314 for conversion to digital form 352. Runout 338 resulting from factors such as noncircularity of the tracks or external shock is added to the digital position information 352 to produce the plant output, y(t).

The controller 304 portion of the system includes a state estimator 316 that dynamically estimates the head position $Xh_{nt}$, actuator velocity $Vh_{nt}$, coil current $Ih_{nt}$, and static windage $Wh_{nt}$ (defined below) for a discrete sample time nt, where t is the inter-sample time and n is an integer. Estimation involves a two-step process. At the end of sample time $(n-1)t$, the values that these parameters are anticipated to have at the next sample time, $nt$, are predicted. The predicted values are designated as $Xb_{nt}$, $Vb_{nt}$, $Ib_{nt}$, and $Wb_{nt}$ to differentiate them from the final estimated values. Predictions are made using the last estimated states of the parameters, $Xh_{(n-1)t}$, $Vh_{(n-1)t}$, $Ih_{(n-1)t}$, and $Wh_{(n-1)t}$, knowledge of the control signal at time $(n-1)t$, i.e., $u((n-1)t)$ 306, and the physical parameters of the disk file (e.g., inertia of the actuator assembly, VCM power amplifier gain, PES gain, inter-sample time $t$, magnetic field strength, etc.) More specifically, position and velocity are predicted by first determining the acceleration of the actuator from the last corrective control current value, $u((n-1)t)$ and the known actuator mass, m, and then integrating to obtain the corresponding velocity and position. The coil current is predicted by taking the low pass of the last $u((n-1)t)$. Static windage is predicted to be a constant.

At the next sample time, $nt$, the estimated parameters are updated to reflect variations in actuator behavior. The preferred algorithm for performing the described updates is illustrated by the following equations:

$$Err = y_{nt} - Xb_{nt} \quad (3)$$

$$Xh_{nt} = Xb_{nt} + L1 \cdot err \quad (4)$$

$$Vh_{nt} = Vb_{nt} + L2 \cdot err \quad (5)$$

$$Ih_{nt} = Ib_{nt} + L3 \cdot err \quad (6)$$

$$Wh_{nt} = Wb_{nt} + L4 \cdot err \quad (7)$$

where $y_{nt}$ 315 is the last position signal received from the plant, and L1–L4 are predetermined design constants selected by the servo designer to produce a desired behavior. For example, the design constant L1 may be selected to have a value less than one that essentially filters out PES noise. Derivation of estimator constants is described in "Digital Control of Dynamic Systems" by Franklin and Powell, Addison-Wesley Publishing Co. (1983), chapter 6, pp. 131–139. $Y_{nt}$ may include components of noise 340 and runout 338, as shown, accounting for some of the inaccuracy in the actuator behavior. PES noise 340 arises from elements such as media noise, electronic noise, and servowriting errors. Runout is attributable to such factors as noncircular tracks resulting from an uncentered spindle, or nonrepeatable external shock.

Figure 4:
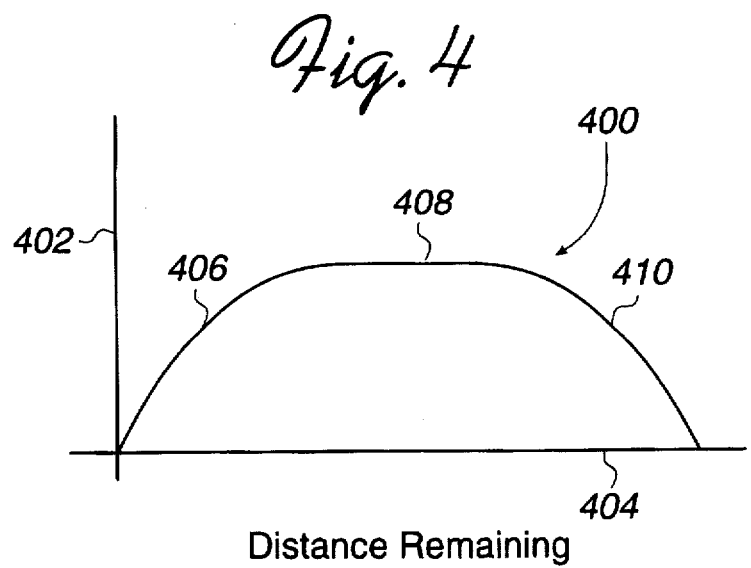
FIG. 4 is an example of an actuator acceleration curve used in generating a control signal in a closed loop servo system.

The estimator 316 next calculates a relative distance, $X_{rel}$ 317, from the difference between a target radial position, and the estimated radial position, $Xh_{nt}$. The target position is obtained from a data access command received from a requesting device. In seek mode, $X_{rel}$ 317 represents the number of tracks remaining to travel, or "tracks to go", to reach the target track. In track following mode, $X_{rel}$ 317 is the offset of the head with respect to the current track center. $X_{rel}$ 317 is used to determine a desired actuator velocity, $V_{de}$ 320, based upon the operating mode and the following relationships:

$$\text{If track following: } V_{de} = K1 \cdot X_{rel} \quad (8)$$

$$\text{If seeking: } V_{de} = P[X_{rel}] \quad (9)$$

where K1 318 represents a scaling constant for converting position into a velocity, and $P[X_{rel}]$ 319 is a function defining a seek acceleration curve. For convenience, a sample acceleration curve 400 is shown in FIG. 4. The vertical axis 402 is in units of velocity and the horizonal axis 404 is in terms of the relative actuator position. The curve typically comprises two to three substantially linear segments, 406, 408, 410, for acceleration, constant velocity, and deceleration or braking, as determined by the distance to travel and performance requirements. The acceleration curve, also referred to as the velocity profile, may be represented by a set of equations or a lookup table. $P[X_{rel}]$ 319 represents a point on the acceleration curve, or alternatively, an entry in the look-up table.

Referring back to FIG. 3B, the desired velocity $V_{de}$ 320 is used to determine a velocity error, $V_{err}$ 324, representative of actuator deviation from a desired velocity. In particular, $V_{err}$ 324 is calculated next by subtracting the desired and estimated actuator velocities:

$$V_{err} = V_{de} - Vh_{nt} \quad (10)$$

$V_{err}$ 324 is scaled by a constant, K2 326, to obtain a first component of the commanded current or control current error, $I_{err}$ 332:

$$I_{err1} = K2 \cdot V_{err} \quad (11)$$

The scaling function can also be performed, for example, by a filter having a gain of K2.

Variations in actuator positioning performance are attributable in part to windage forces. Static windage forces are the stationary bias forces acting upon the actuator, and are caused by factors such as airflow from the rotating disk, the presence of a flex cable attached to the arm structure, grease build-up in the actuator bearings, and bearing deformities for example.

Because actuator movement during track seeking is orders of magnitude greater than its movement during track following, windage forces have little effect upon the servo control system during seek operations. However, they become a primary contributor to track misregistration when in track following mode. For this reason, corrective means are included in the feedback loop to receive the position information, $y_{nt}$ 315, and to produce therefrom a second component, $I_{err2}$ 330, of the error correction signal, $I_{err}$ 332, during track following. This second component is designed to cancel the effects of static windage.

VARIATION IN TORQUE FACTOR

Another key contributor to actuator deviation is variation in the torque factor, as discussed previously. As will be understood by those skilled in the art, the nominal variation in torque factor with radial position for a population of disk drives can be expressed by a polynomial:

$$KTnom(r) = Ar^4 + Br^3 + Cr^2 + Dr + DC \quad (12)$$

where A–D and DC are coefficients determined from the disk drive design characteristics, and the dependent variable, r, is the radial position of the transducer relative to the disk. DC is a constant representative of a DC offset.

To compensate for variations in KT, a scaling stage 334 is provided in the feedback path of the servo system. The scaling stage 334 receives the corrective signal, $I_{err}$ 332, and multiplies it by a scaling factor to produce the adjusted corrective control signal, $u(nt)$ 306. The scaling factor is represented by a polynomial, $KTadj(r)$, which is derived from the ratio of a predetermined nominal torque factor constant, $KT_{nom}$, to the actual torque factor at a current radial position r. Actual torque factor is calculated from a polynomial, KTact(r) 506, which is derived by calibrating the nominal torque factor curve, KTnom(r) for the particular file.

Figure 5:
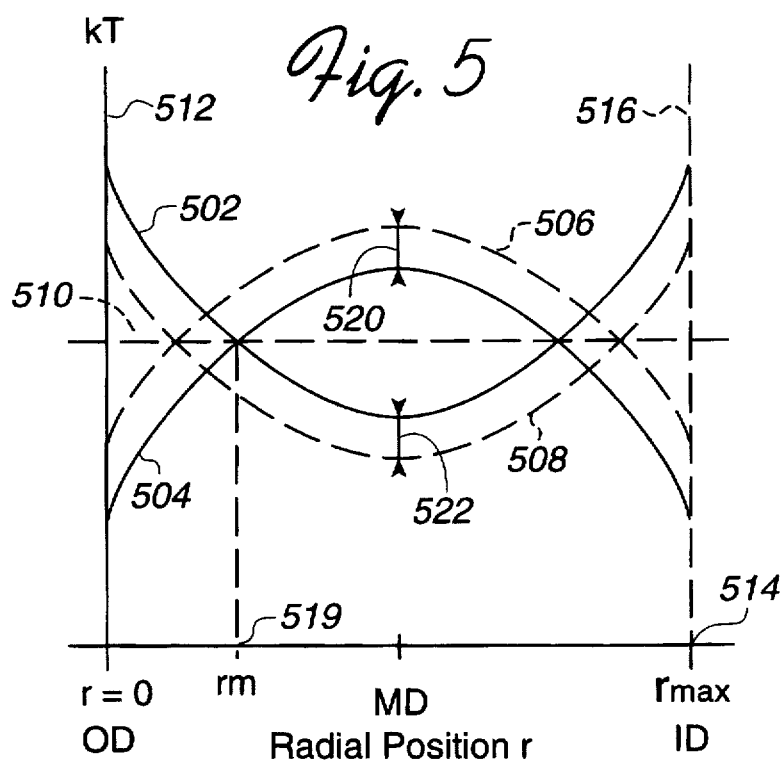
FIG. 5 is a graph showing the interrelationships of the torque factor curves and constants used to adjust a servo control signal.

FIG. 5 shows the relationships of the nominal torque factor constant, $KT_{nom}$ 510, a nominal torque factor curve 504, an actual torque factor curve 506, a curve 502 obtained by multiplying a nominal scaling polynomial KTadj(r) by $KT_{nom}$, and a curve 508 obtained by calibrating curve 502. The vertical axis 512 is expressed in terms of torque constant, KT, e.g., Newton-meters/Amp or Torque/Amp. The horizontal axis 514 represents radial actuator position r, e.g., in meters. The outer diameter (OD) of the disk corresponds to r=0, and the inner diameter has a radial value of $r_{max}$ (indicated by the dashed vertical line 516), with the middle diameter (MD) position therebetween. For convenience, the $KT_{nom}$ 510 constant is selected to approximate a mean or average value of the points on the KTnom(r) curve 504, e.g., 0.1 Nm/Amp. The actual torque factor curve, KTact(r) 506, is expected to vary from the nominal torque factor curve, KTnom(r) 504, by a vertical DC displacement 520 in the positive or negative direction Thus, KTact(r) and KTnom(r) are identical at each radial position r except for their DC terms such that:

$$KTact(r_0) = KTnom(r_0) + \epsilon, \text{ and} \quad (13)$$

$$KTadj(r_0) = KT_{nom}/KTact(r_0) \quad (14)$$

$$= KT_{nom}/(KT_{nom}(r_0) + \epsilon)$$

KTadj(r) is a unitless number having, for example, a value of one when KTact(r)=$KT_{nom}$. If multiplied by constant $KT_{nom}$, it essentially comprises an inverted KTact(r) curve 506 having the same units as KTact(r) and KTnom(r), e.g, Newton-meters per Amp, and its value at any radial position can be seen to effectively counteract KT variations at the same radial position on the KTact(r) curve. For this reason, if KTact(r) is vertically displaced from KTnom(r), KTadj(r) *$KT_{nom}$ 502 will be offset by a same amount 522 in the opposite direction, as illustrated by curve 508.

Changes in the operating conditions of a file over time will cause further variation in the torque factor curve, KTact(r). Consequently, the DC term of KTadj(r) is periodically recalibrated. Calibration is performed, for example, according to the following sequence: 1) first, a seek is executed to a known initial radial position $R_{in}$; 2) next, a constant control current is adjusted by the scaling factor KTadj(r) and applied to the voice coil to move the head in the direction of the ID; 3) after a predetermined period of time, T, the distance $X_{in}$ traveled by the head is determined; 4) next, a seek is executed to a known radial position $R_{out}$; 5) again, a constant control current is adjusted by KTadj(r) and applied to the coil, this time to move the head in the direction of the OD; 6) after a same predetermined period of time T, the distance $X_{out}$ traveled by the head is determined; 7) a corrective factor, D, is determined from the relationship, $$D = 1 - X_{nom}/(X_{in} + X_{out}), \quad (15)$$

where $X_{nom}$ is the amount of motion expected if the torque factor were determined by KTnom(r) (the division is usually approximated as a power series); and finally, 8) KTadj(r) is adjusted by adding D to its DC coefficient, KTadj(r)+D. Seeking is performed in both directions to eliminate windage effects from the calibration calculation.

The preceding sequence is also used to determine the KTadj(r) polynomial, with the exception that the current in steps 2 and 5 is not adjusted. Essentially, the above algorithm is repeated at several different radial positions to obtain a set of points of torque factor versus position. This collection of data points is $\{X_n, KT_n\}$ where $X_n$ is a position at which the torque factor is measured, and $KT_n$ is the corresponding measurements KTact(r) can be obtained by fitting a polynomial to this data set. KTadj(r) is obtained by fitting a polynomial to the set of points $\{X_n, KT_{nom}/KT_n\}$. In current practice, the $KT_n$ values are the results of a population average, and so the polynomial KTadj(r) is a best fit to a population average. However, according to an important aspect of the present invention, the determination of KTadj(r) is performed on a file-by-file basis for greater servo accuracy, and the resulting, personalized polynomial is stored to the nonvolatile memory of the file and/or to a reserved area of the disk.

Completing the path of FIG. 3B, the output of the scaling stage produces the next corrective control signal, u(nt), which is provided to the driver electronics 310, converted into a corrective current $I_{adj}$ 342 and applied to the actuator coil to produce a corrective moving force.

Figure 6:
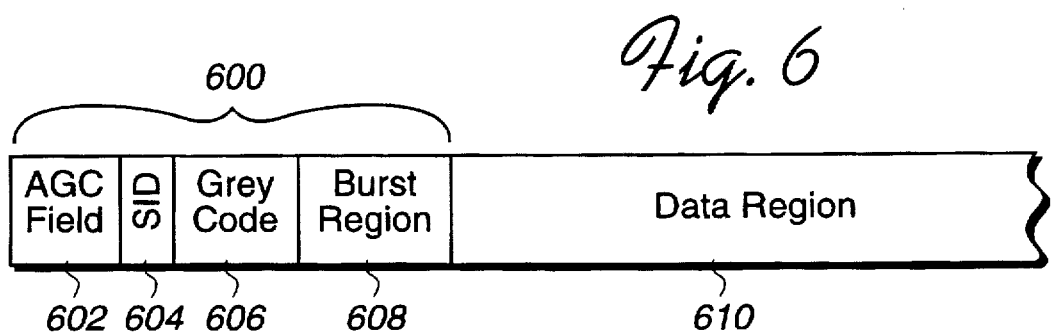
FIG. 6 represents a portion of a track in a sector servo disk drive suitable for implementing the present invention.

FIG. 6 is representative of a portion of a data track in an embedded servo disk drive including a servo sector 600 adjacent to a data region 610. The servo sector comprises an AGC field 602 for enabling AGC gain adjustment and bit synchronization of the channel, a sector identification mark (SID) 604 to synchronize the servo electronics to the disk, a track identifier field or grey code 606, and an analog burst region 608 for generating a position error signal. The grey code field 606 contains information for uniquely identifying the current servo sector 600, e.g., the current cylinder, head and sector number. The burst region 608 preferably contains a quadrature burst pattern for producing an analog signal containing relative head position information. The analog signal is demodulated and digitized to produce a position error signal (PES). Both the grey code and the PES are stitched together to provide a digital position signal 352, the primary component of the plant output y(t). Systems and methods for detecting servo information and generating position signals therefrom are numerous and well known in the art. Since the present invention may be adapted to a wide variety of servo control systems, the particular method and system used to provide position information are not considered pertinent to practicing the present invention.

INCORPORATING CURRENT MAGNITUDE AND DIRECTION IN SCALING STAGE

Figure 7:
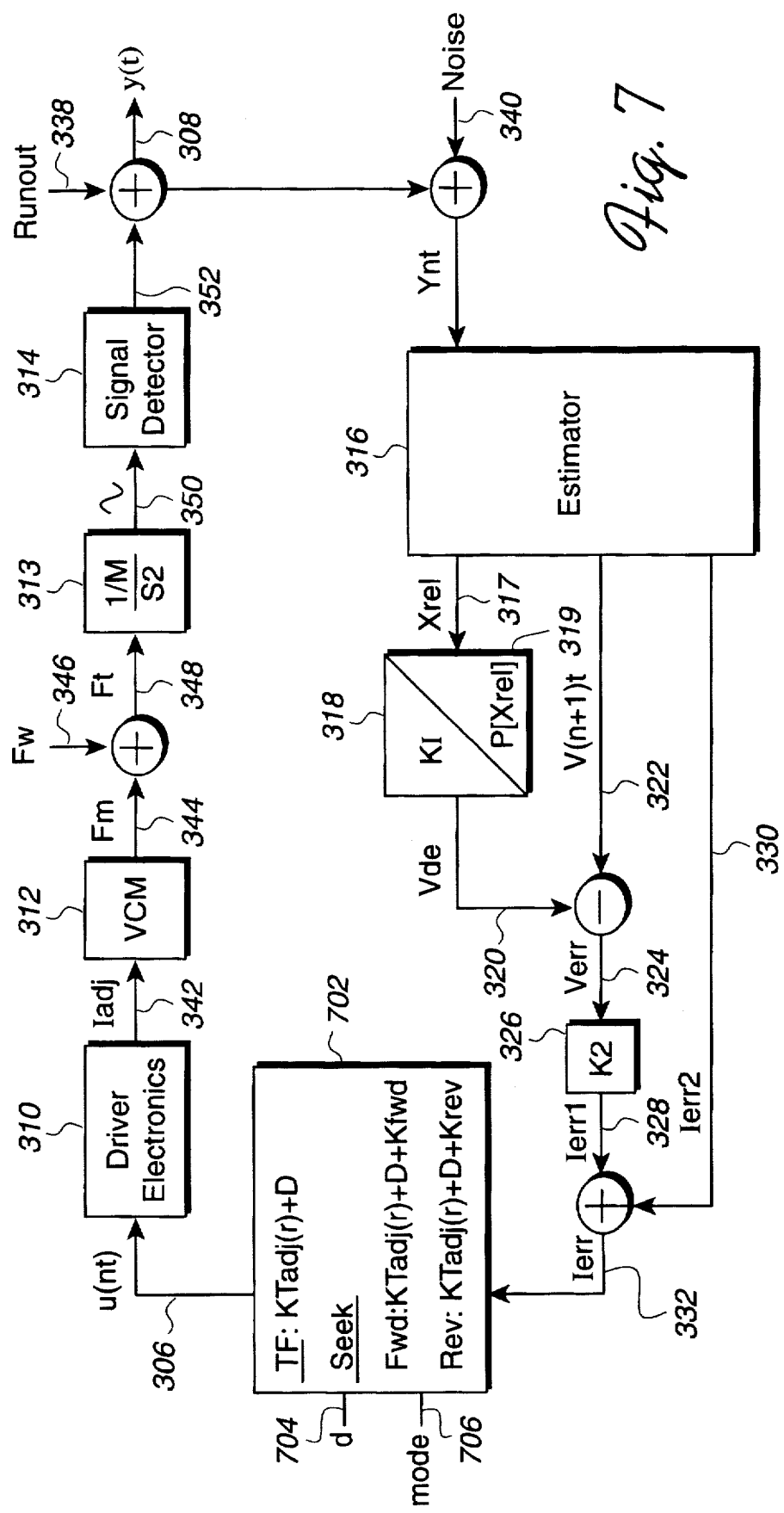
FIG. 7 is a block diagram of servo control system model according to the system and method of the present invention.

FIG. 7 is a block diagram of the proposed servo control system of the present invention incorporating means for adjusting the control for variations in KT with coil current magnitude and direction. The plant is identical to that of FIG. 3B. But the estimator function 316 has been modified.

The scaling stage 702 differs from that in FIG. 3B by providing three different scaling factors, as determined by the actuator mode of operation and direction of movement. In particulars during track following mode, the scaling factor is determined from the calibrated curve, KTadj(r)+D, as described above. But during seek operations, an additional constant is added to the adjustment curve. If seeking in the forward direction, the scaling factor is KTadj(r)+D+$K_{fwd}$, where $K_{fwd}$ is a constant incorporating measured variations in torque factor for a forward direction of actuator movement, or alternatively, is a factor dependent upon the magnitude and direction of the coil current. Similarly, for reverse seeks, the scaling factor is KTadj(r)+D+$K_{rev}$, where $K_{rev}$ is a constant incorporating measured variations in KT for a reverse direction of movement, or again, is alternatively dependent upon the direction and magnitude of the coil current.

Unlike the determination of the DC correction to the KTadj(r) polynomial, the selection of $K_{fwd}$ and $K_{rev}$ is done empirically. This limitation is imposed by the static windage; unless this force is known precisely, it changes the expected distance traveled in step 3 of the calibration algorithm described previously. The uncertainty is overcome in the calibration sequence by seeking in both directions over the same region, as described in step 7. However, because of this required averaging of seeks in both directions, the effects of coil current magnitude and direction cannot be measured directly with the calibrating algorithm.

Indirect measurements of $K_{fwd}$ and $K_{rev}$ may be obtained, for example, in the following manner. From physical reasoning of the effects of the coil current on the magnetic field, a range of possible values for $K_{fwd}$ and a range for $K_{rev}$ suggest themselves. From these two ranges, a subset of values is selected for each of these parameters. Some or all possible combinations of these representative values of $K_{fwd}$ and $K_{rev}$ are then tested in a simulated file operation. The combination of values that provide the best performance according to a predetermined performance indicator are then selected. The simulated operation can be a fixed seek pattern or a random seek pattern, for example. The performance indicator is preferably settle time. The number of values included in each subset, the number of seeks performed for each pair of values, and the complexity of the seek pattern will vary according to circumstances In lab tests, 1000 random seeks were performed for each combination of $K_{fwd}$ and $K_{rev}$ values to select the optimal combination. For a manufacturing environment, a fixed seek pattern of 15 seek lengths repeated several times is faster and will suffice.

Alternatively, the directional variations are expressed as functions of current, Kfwd(i) and Krev(i) rather than as constants, $K_{fwd}$ and $K_{rev}$. The functions, Kfwd(i) and Krev (i), like the constants, must be determined indirectly, ie. empirically. This is done in the following manner. From physical reasoning of the effects of the coil current on the magnetic field, a set of possible functions for Krev(i) and a set for Kfwd(i) suggest themselves. For example, a simple one is:

$$Kfwd(i) = \alpha_{fwd} I_{coil} + \beta_{fwd}, \text{ and} \tag{16}$$

$$Krev(i) = \alpha_{rev} I_{coil} + \beta_{rev} \tag{17}$$

where $I_{coil}$ is the current in the coil and assuming for simplicity that $I_{coil}$ is positive for actuator movement in the forward direction and negative for movement in the reverse direction. Here, $\alpha_{fwd}$, $\beta_{fwd}$, $\alpha_{rev}$ and $\beta_{rev}$ are constants. Different candidate values for these constants can be selected from physical reasoning and intuition, since the approximate magnitude of the effect is known. Similarly to the method for selecting constants $K_{fwd}$ and $K_{rev}$, several candidate values are selected for Krev(i) and several others for Kfwd(i) in a simulated file operation. Then the pairs $(\alpha_{fwd}, \beta_{fwd})$ and $(\alpha_{rev}, \beta_{rev})$ are chosen for Kfwd(i) and Krev(i) that minimize a performance measure of choice. Specifically, the simulated operation can again be either a fixed seek pattern, or a random seek pattern and the performance measure of choice will be a seek performance parameter such as settle time.

To enable the scaling stage 702 to select the appropriate scaling factor, the actuator mode of operation 706 and the seek direction 704 are provided as inputs by the servo controller. The servo controller keeps track of the actuator operating mode to scale various constants in the servo loop. It also knows the direction of seeking from the sign of the calculated number of tracks to go (i.e., the relative actuator position, $X_{rel}$). Thus these inputs are readily available to the scaling stage from the servo controller. Alternatively, mode and direction may be obtained directly from the magnitude and direction of the current applied to the voice coil, $I_{adj}$, since the direction of current is an indicator of the direction of actuator movement, and the magnitude of the current is in a much higher range for seeks than for track following.

Figure 8:
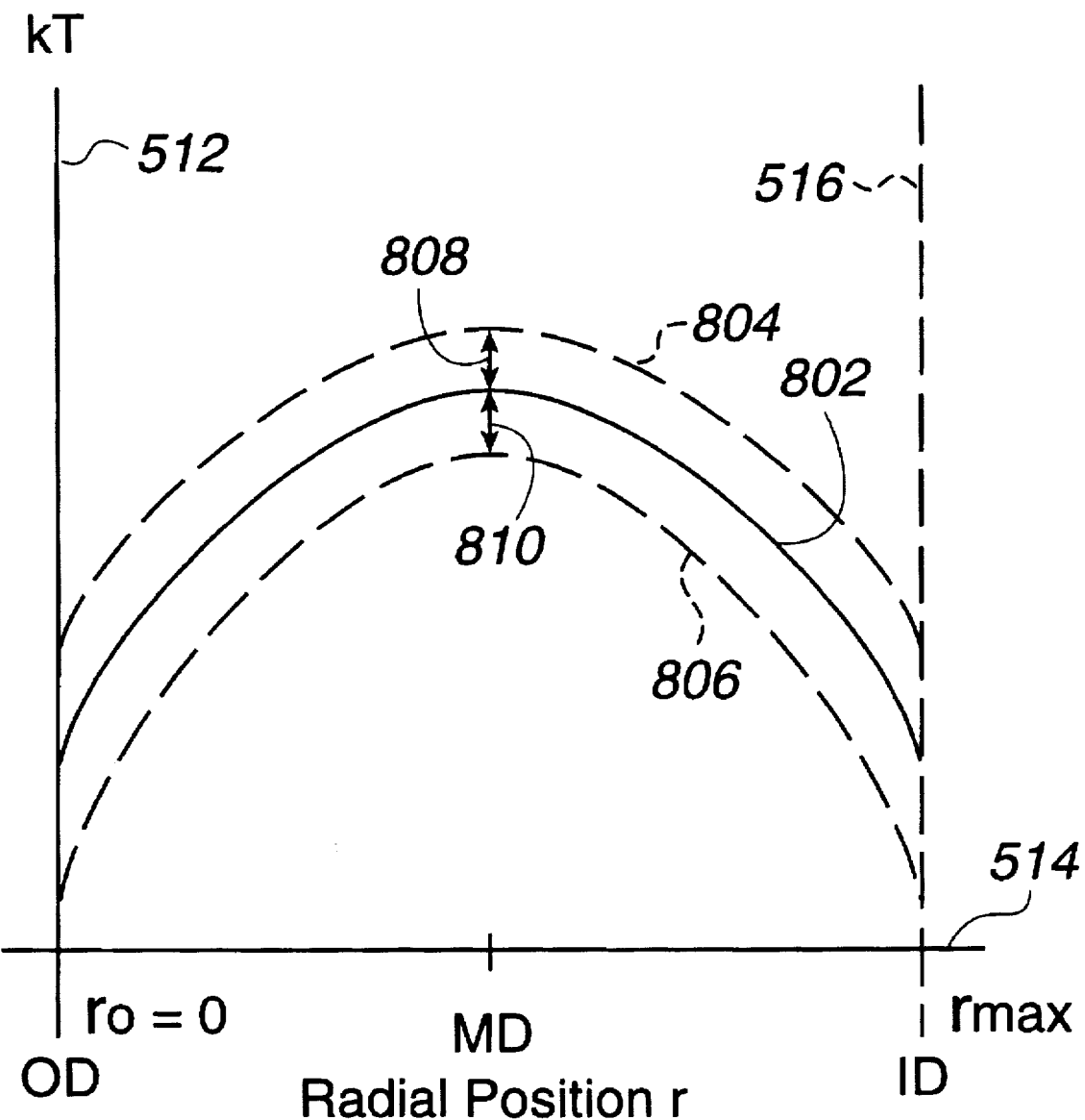
FIG. 8 is a graph contrasting a nominal Kf curve to the actual Kf curves of a disk drive for movement in the forward and reverse seek directions.

FIG. 8 is a graph illustrating the KTadj(r)+$K_{fwd}$ and KTadj(r)+$K_{rev}$ polynomials, 804, 806 obtained for a disk drive or population of disk drives according to the present invention. The curves are shown relative to a nominal KTadj(r) curve 802 and can be seen to have offsets 808, 810 from the nominal curve 802 equal to the constants $K_{fwd}$ and $K_{rev}$, respectively.

One benefit of importance obtained by the scaling method of the present invention is that the accuracy of dynamic windage compensation, $I_{err2}$, provided by the estimator is substantially improved. Dynamic windage refers to the bias forces that change with actuator position. In the previous servo systems, the error used to update estimated windage as shown in equations (3) and (7), included components of directional variation when seeking. Thus error was introduced into the updated windage value, $Wh_{nr}$. Under the new scaling scheme, these components of the error are substantially reduced. Consequently, the updated estimated windage is substantially improved, particularly in light of the fact that windage is greater during seeking than track following since the control current is much larger during seek mode. The direct consequence of this is that the static windage estimate upon arrival is improved. This improvement, in turn, decreases the settle time.

A number of specific embodiments have been described encompassing the present invention. Nevertheless, it will be understood that various modifications may become apparent to those having ordinary skill in the art of self servo propagation without departing from the spirit and the scope of the present invention. Accordingly, it is to be understood that the invention is not to be limited by the specific illustrated embodiments, but only by the scope of the appended claims.

We claim:

1. A servo control system for use in a storage device including a rotatable storage medium and an actuator assembly capable of moving in substantially radial forward and reverse directions with respect to the media in response to a control signal, comprising:

first means for determining the radial position of the actuator assembly;

second means responsive to the radial position for generating a corrective signal;

means for determining a first amount incorporating variations in force factor for a forward direction of actuator movement;

means for determining a second amount incorporating variations in force factor for a reverse direction of actuator movement, wherein the first and second amounts are different values;

third means for adjusting the corrective signal by the first amount during track seeking in the forward direction; and fourth means for adjusting the corrective signal by the second amount during track seeking in the reverse direction.

2. The system of claim 1 wherein the media includes a track, and wherein the actuator assembly is capable of following the track, further comprising a fifth means for adjusting the corrective signal by a third amount during track following.

3. The system of claim 2, wherein the third, fourth, and fifth means are implemented within a processor.

4. The system of claim 1, wherein said second means comprises a state estimator.

5. The system of claim 4, wherein the state estimator generates first and second components for producing the corrective signal, and wherein one of the first and second components corrects for windage forces during actuator movement.

6. The system of claim 1, wherein the third and fourth means are implemented within a processor.

7. A servo control system for use in a storage device including a rotatable storage media and an actuator assembly capable of moving in substantially radial forward and reverse directions with respect to the media in response to a control signal, comprising:

a transducer coupled to detection logic for determining the radial position of the actuator assembly from position information on the media; and a processor responsive to the radial position for generating a corrective signal, for determining a first amount incorporating variations in force factor for a forward direction of actuator movement, for determining a second amount incorporating variations in force factor for a reverse direction of actuator movement, wherein the first and second amounts are different values, and for scaling the corrective signal by the first amount during track seeking in the forward direction and by the second amount during track seeking in the reverse direction.

8. The system of claim 7, wherein the media includes a track, and wherein the actuator assembly is capable of following the track, and wherein the processor scales the corrective signal by a third amount during track following.

9. The system of claim 8, wherein the processor determines the third amount using a third scaling factor polynomial.

10. The system of claim 9, wherein the third polynomial incorporates variations in force factor with actuator position.

11. The system of claim 8, wherein the third amount is personalized to the system.

12. The system of claim 7, wherein the processor generates first and second components for producing the corrective signal, and wherein one of the first and second components corrects for windage forces during actuator movement.

13. The system of claim 7, wherein the processor determines the first amount using a first scaling factor polynomial incorporating variations in force factor determined for a forward direction of actuator movement.

14. The system of claim 13, wherein the first polynomial further incorporates variations in force factor with actuator position.

15. The system of claim 13, wherein the directional variations in force factor are determined empirically by selecting a DC constant which minimizes the time for the actuator assembly to complete a predetermined pattern of forward actuator movement.

16. The system of claim 7, wherein the processor determines the second amount using a second scaling factor polynomial incorporating variations in force factor determined for a reverse direction of actuator movement.

17. The system of claim 16, wherein the second polynomial further incorporates variations in force factor with actuator position.

18. The system of claim 16, wherein the directional variations in force factor are determined empirically by selecting a DC constant which minimizes the time for the actuator assembly to complete a predetermined pattern of reverse actuator movement.

19. The system of claim 7, wherein the first amount is personalized to the system.

20. The system of claim 7, wherein the second amount is personalized to the system.

21. A servo control method for use in a storage device including a rotatable storage media and an actuator assembly capable of moving in substantially radial forward and reverse directions with respect to the media in response to a control signal, comprising the steps of:

determining the radial position of the actuator assembly from position information on the media;

using the radial position information to generate a corrective signal;

determining a first amount incorporating variations in force factor for a forward direction of actuator movement;

determining a second amount incorporating variations in force factor for a reverse direction of actuator movement, wherein the first and second amounts are different values; and scaling the corrective signal by the first amount during track seeking in the forward direction and by the second amount during track seeking in the reverse direction.

22. The method of claim 21, wherein the media includes a track, and wherein the actuator assembly is capable of following the track, further comprising the step of scaling the corrective signal by a third amount during track following.

23. The method of claim 23, further comprising the step of determining the third amount using a third scaling factor polynomial.

24. The method of claim 23, wherein the third polynomial incorporates variations in force factor with actuator position.

25. The method of claim 22, wherein the third amount is personalized to the system.

26. The method of claim 21, further comprising the steps of generating first and second components for producing the corrective signal, wherein one of the first and second components corrects for windage forces during reverse actuator movement.

27. The method of claim 21, further comprising the step of determining the first amount using a first scaling factor polynomial incorporating variations in force factor determined for a forward direction of actuator movement.

28. The method of claim 27 wherein the first polynomial further incorporates variations in force factor with actuator position.

29. The method of claim 27, wherein the directional variations in force factor are determined empirically by selecting a DC constant which minimizes the time for the actuator assembly to complete a predetermined pattern of forward actuator movement.

30. The method of claim 21, further comprising the step of determining the second amount using a second scaling factor polynomial incorporating variations in force factor determined for a reverse direction of actuator movement.

31. The method of claim 30, wherein the second polynomial further incorporates variations in force factor with actuator position.

32. The method of claim 30, wherein the directional variations in force factor are determined empirically by selecting a DC constant which minimizes the time for the actuator assembly to complete a predetermined pattern of reverse actuator movement.

33. The system of claim 21, wherein the first amount is personalized to the system.

34. The system of claim 21, wherein the second amount is personalized to the system.

* * * * *

UNITED STATES PATENT AND TRADEMARK OFFICE
CERTIFICATE OF CORRECTION

PATENT NO. : 5,912,782
DATED : June 15, 1999
INVENTOR(S) : Lee, Oettinger, Serrano, and Yu It is certified that error appears in the above-identified patent and that said Letters Patent is hereby corrected as shown below:

Abstract, line 5, following "following" insert ,

Col. 2, line 65, delete "et ale." and insert et al.

Col. 3, line 13, after ")" insert .

Col. 3, line 60, delete "inventions." and insert invention.

Col. 4, line 39, delete "designs" and insert design,

Col. 4, line 48, delete "Dread" and insert read

Col. 5, line 47, delete "responses" and insert response,

Col. 10, line 8, delete "measurements" and insert measurement.

Col. 10, line 57, after "particular" insert ,

Col. 11, line 29, after "circumstances" insert .

Col. 13, line 25, delete "scalling" and insert scaling.

Col. 14, line 28, delete "claim 23" and insert claim 22.

Signed and Sealed this

Twenty-seventh Day of March, 2001

Attest:

NICHOLAS P. GODICI

Attesting Officer

Acting Director of the United States Patent and Trademark Office